US006967729B1

(12) United States Patent
Iwamura

(10) Patent No.: US 6,967,729 B1
(45) Date of Patent: Nov. 22, 2005

(54) CONTROL UNIT AND METHOD FOR CONTROLLING MOTOR FOR USE IN PRINTER, AND STORAGE MEDIUM STORING CONTROL PROGRAM

(75) Inventor: Katsutoshi Iwamura, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 1031 days.

(21) Appl. No.: 09/651,096

(22) Filed: Aug. 30, 2000

(30) Foreign Application Priority Data

| | | |
|---|---|---|
| Aug. 31, 1999 | (JP) | 11-246209 |
| Dec. 24, 1999 | (JP) | 11-368019 |
| Jun. 5, 2000 | (JP) | 2000-167763 |

(51) Int. Cl.[7] .......................... G06F 15/00; B41J 11/00
(52) U.S. Cl. ..................... 358/1.12; 358/1.12; 347/218
(58) Field of Search ............................. 358/1.12, 1.16, 358/1.15; 347/218, 19; 247/218

(56) References Cited

U.S. PATENT DOCUMENTS 5,555,462 A * 9/1996 Fukumoto et al. .......... 347/218

FOREIGN PATENT DOCUMENTS

JP 03-262663 11/1991 ............ B41J 11/42

OTHER PUBLICATIONS

JPO Abstract 03(1991)-262663, Dec. 22, 1991.

* cited by examiner

*Primary Examiner*—Kimberly Williams
*Assistant Examiner*—Saeid Ebrahimi-Dehkordy
(74) *Attorney, Agent, or Firm*—Sughrue Mion, PLLC

(57) ABSTRACT

There is provided precise paper feeding. A control unit for controlling a motor for use in a printer includes a position counter to count output pulses of an encoder that rotates to follow rotation of the motor and detect a position of a printing medium transferred by the motor; a target control amount modifying and calculating part to calculate a modified target value of a feed-amount of the printing medium based on a target value of a feed-amount of the printing medium and a previous stop position of the printing medium detected by the position counter, and set a counted value of the position counter to the modified target value; and a position control part to control the motor so that the counted value of the position counter falls into a predetermined range including zero.

23 Claims, 13 Drawing Sheets

CONTROL UNIT AND METHOD FOR CONTROLLING MOTOR FOR USE IN PRINTER, AND STORAGE MEDIUM STORING CONTROL PROGRAM

BACKGROUND OF THE INVENTION

1. Field of the Invention

The present invention relates generally to a control unit and method for controlling a motor for use in a printer, and a storage medium storing a control program.

2. Description of Related Art

Conventionally, paper-feed control for printers is performed by controlling a paper-feed motor (called a PF motor hereinafter). Control of a PF motor using a DC (Direct Current) motor as the PF motor is performed as follows. The PF motor is started by acceleration control. The motor is then driven at a constant speed by PID control, and decelerated to stop. PID control is performed based on a deviation of the number of output pulses of an encoder that rotates to follow the rotation of the PF motor from a target number of pulses (position).

PID control is, however, has following drawbacks: It is difficult to precisely stop a PF motor at a target position. An actual position at which a PF motor stops may fall in an allowable range, however, is distant from the target position. The PF motor sometimes rotates a little bit after stoppage due to disturbance, such as, vibration of a carriage in serial printer.

In the event of paper-feed processing by starting a PF motor again after stoppage, since a target position for the motor is set with reference to the target position that has been set at a previous motor start-up before stoppage, printing medium (sheet of paper) may stop at a position further distant form the target position. This results in printing at positions distant from desired positions.

SUMMARY OF THE INVENTION

It is therefore an object of the present invention to eliminate the aforementioned problems and to provide a control unit, a method and also a storage medium storing a control program for controlling a motor for use in a printer, which offer precise positioning of a printing medium even the motor starts again after stoppage.

The present invention provides A control unit for controlling a motor for use in a printer including: a position counter to count output pulses of an encoder that rotates to follow rotation of the motor and thereby detect a position of a printing medium transferred by the motor; a target control amount modifying and calculating part to calculate an modified target value of a feed-amount of the printing medium based on a target value of a feed-amount of the printing medium and a previous stop position of the printing medium detected by the position counter, and set a counted value of the position counter to the modified target value; and a position control part to control the motor so that the counted value of the position counter falls into a predetermined range including zero.

Moreover, the present invention provides a control unit for controlling a motor for use in a printer including: a position detecting part to detect a position of a printing medium transferred by the motor; a target position modifying and calculating part to calculate a modified target position of the printing medium based on a target value of a feed-amount of the printing medium at the present motor start-up, another target value of a feed-amount of the printing medium at a previous motor start-up, and a position of the printing medium detected by the position detecting part just before the present motor start-up; and a position control part to control the motor based on positional deviation of the position detected by the position detecting part from the modified target position.

The target position modifying and calculating part may include: an error calculating part to calculate an error of the feed-amount of the printing medium at the previous motor start-up based on a target value of a control amount at a previous motor start-up and the position detected by the position detecting part just before the present motor start-up; and an adder to add the target value of a feed-amount of the printing medium at the present motor start-up and the error.

Furthermore, the present invention provides a control method of controlling a motor for use in a printer including the steps of: counting output pulses of an encoder that rotates to follow rotation of the motor and detecting a position of a printing medium transferred by the motor by a position counter; calculating a modified target value of a feed-amount of the printing medium based on a target value of a feed-amount of the printing medium and a previous stop position of the printing medium detected by the position counter, and setting a counted value of the position counter to the modified target value; and controlling the motor so that the counted value of the position counter falls into a predetermined range including zero.

The step of controlling may perform PID control.

The position counter may count-up or count-down the output pulses according a normal or reverse rotation of the motor.

Moreover, the present invention provides a method of controlling a motor for use in a printer including the steps of: detecting a position of a printing medium transferred by the motor; calculating a modified target position value of the printing medium based on a target value of a feed-amount of the printing medium at the present motor start-up, another target value of a feed-amount of the printing medium at a previous motor start-up, and a position of the printing medium detected just before the present motor start-up; and controlling the motor based on positional deviation of the position detected by the position detecting part from the modified target position.

Furthermore, the present invention provides a processor readable medium storing program code for causing a computer to control a motor for use in a printer including: first program code means for, by a position counter, counting output pulses of an encoder that rotates to follow rotation of the motor to detect a position of a printing medium transferred by the motor; second program code means for modifying and calculating part to calculate a modified target value of a feed-amount of the printing medium based on a target value of a feed-amount of the printing medium and a previous stop position of the printing medium detected by the position counter, and setting a counted value of the position counter to the modified target value; and third program code means for controlling the motor so that the counted value of the position counter falls into a predetermined range including zero.

Moreover, the present invention provides a processor readable medium storing program code for causing a computer to control a motor for use in a printer including: first program code means for detecting a position of a printing medium transferred by the motor; second program code means for calculating a modified target position of the printing medium based on a target value of a feed-amount of the printing medium at the present motor start-up, another target value of a feed-amount of the printing medium at a previous motor start-up, and a position of the printing medium detected just before the present motor start-up; and third program code means for controlling the motor based on positional deviation of the detected position of the printing medium from the modified target position.

Still furthermore, the present invention provides a control unit for controlling a motor for use in a printer including: a position counter to detect a position of a sheet of paper transferred by a paper-feed motor based on output pulses of an encoder that rotates to follow rotation of the paper-feed motor; a driving part to apply a current value to the paper-feed motor based on a target value of a feed-amount of the sheet of paper and an output of the position counter, to drive the paper-feed motor; a current value signal generating part to determine whether the absolute value of deviation of the output of the position counter from the target value of the feed-amount of the sheet of paper falls in the range of a first predetermined value to a second predetermined value smaller than the first predetermined value during stoppage of the paper-feed motor, to generate a current value signal, when the absolute value of deviation falls in the range, so that the deviation becomes zero, wherein the driving part drives the paper-feed motor based on the current value signal.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of the present invention will be described below.

Figure 5:
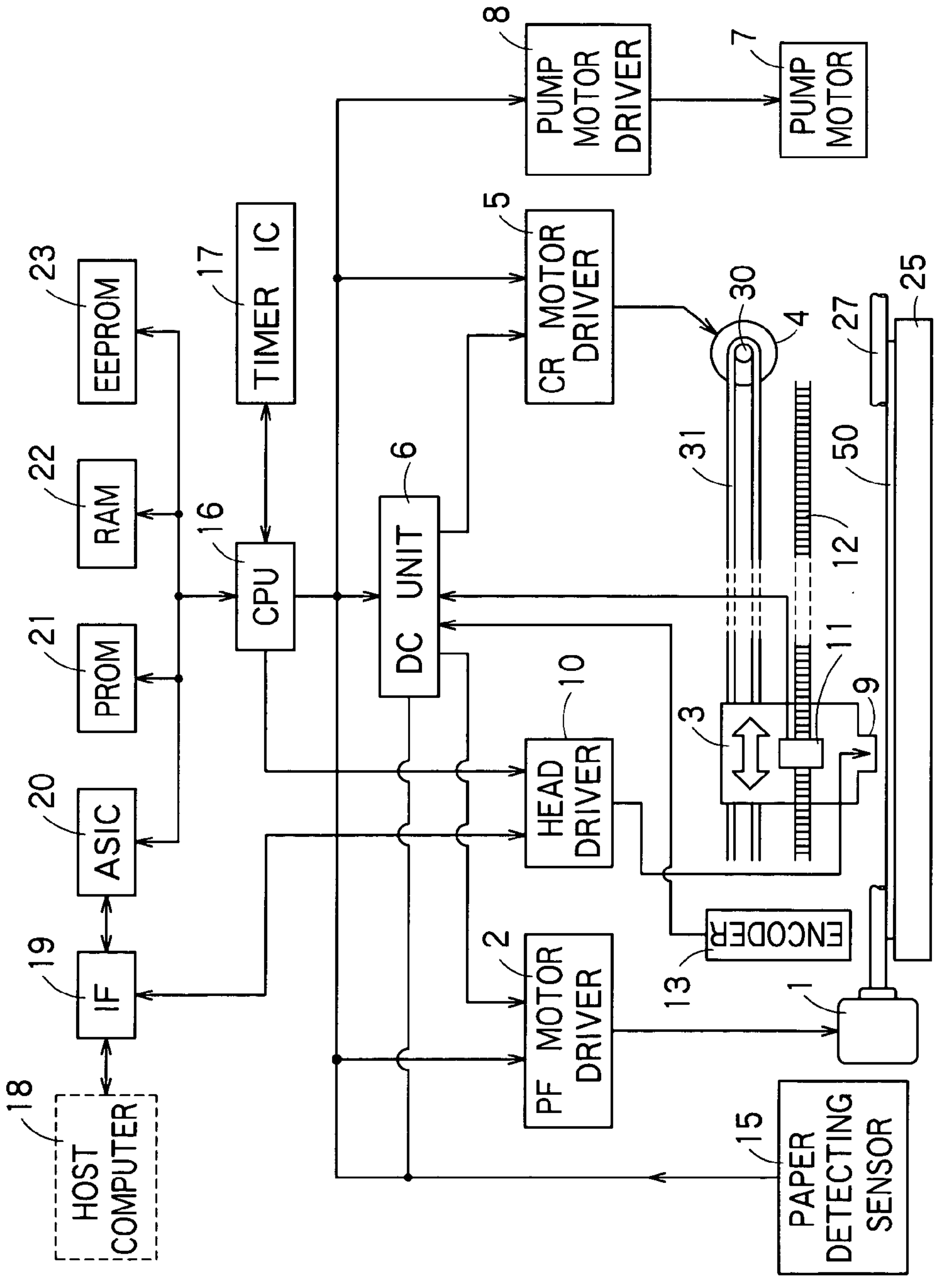
FIG. 5 is a block diagram schematically showing the construction of an ink jet printer.

First, the schematic construction and control of an ink jet printer, which uses a control unit for controlling a motor for use in a printer according to the present invention, will be described. The schematic construction of this ink jet printer is shown in FIG. 5.

This ink jet printer comprises: a paper feed motor (which will be also hereinafter referred to as a PF motor) 1 for feeding a sheet of paper; a paper feed motor driver 2 for driving the paper feed motor 1; a carriage 3; a carriage motor (which will be also hereinafter referred to as a CR motor) 4; a CR motor driver 5 for driving the carriage motor 4; a DC unit 6; a pump motor 7 for controlling the suction of ink for preventing clogging; a pump motor driver 8 for driving the pump motor 7; a recording head 9, fixed to the carriage 3, for discharging ink to a printing paper 50; a head driver 10 for driving and controlling the recording head 9; a linear type encoder 11 fixed to the carriage 3; a code plate 12 which has slits in regular intervals; a rotary type encoder 13 for use in the PF motor 1; a paper detecting sensor 15 for detecting the position of the rear edge of a paper which is being printed; a CPU 16 for controlling the whole printer; a timer IC 17 for periodically generating an interruption signal to output the signal to the CPU 16; an interface part (which will be also hereinafter referred to as an IF) 19 for transmitting/receiving data to/from a host computer 18; an ASIC 20 for controlling the printing definition, the driving waveform of the recording head 9 and so forth on the basis of printing information which is fed from the host computer 18 via the IF 19; a PROM 21, RAM 22 and EEPROM 23 which are used as working and program storing regions for the ASIC 20 and the CPU 16; a platen 25 for supporting the paper 50 during print; a carrier roller 27, driven by the PF motor 1, for carrying the printing paper 50; a pulley 30 mounted on the rotating shaft of the CR motor 4; and a timing belt 31 driven by the pulley 30.

Furthermore, the DC unit 6 is designed to drive and control the paper feed motor driver 2 and the CR motor driver 5 on the basis of a control command, which is fed from the CPU 16, and the outputs of the encoders 11 and 13. In addition, each of the paper feed motor 1 and the CR motor 4 comprises a DC motor.

Figure 6:
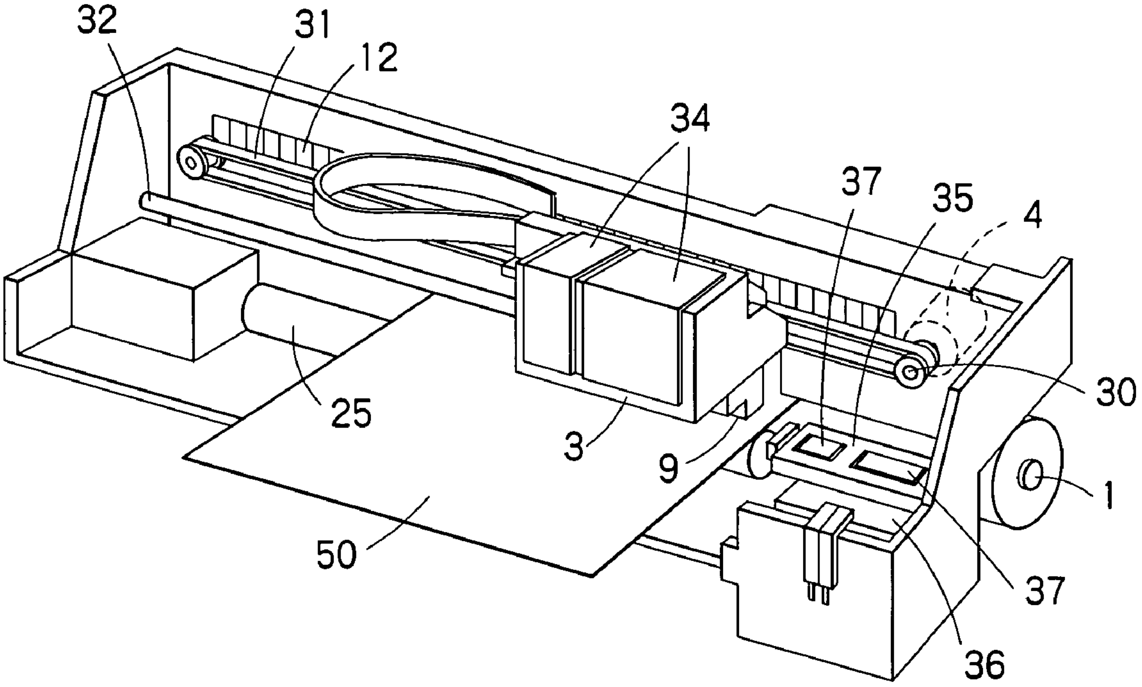
FIG. 6 is a perspective view showing the peripheral construction of a carriage.

The peripheral construction of the carriage 3 of this ink jet printer is shown in FIG. 6.

The carriage 3 is connected to the carriage motor 4 via the timing belt 31 and the pulley 30 to be driven so as to be guided by a guide member 32 to move in parallel to the platen 25. The carriage 3 is provided with the recording head 9 on the surface facing the printing paper. The recording head 9 comprises a nozzle row for discharging a black ink and a nozzle row for discharging color inks. Each nozzle is supplied with ink from an ink cartridge 34, and discharges drops of ink to the printing paper to print characters and/or images.

In a non-print region of the carriage 3, there are provided a capping unit 35 for sealing a nozzle opening of the recording head 9 during non-print, and a pump unit 36 having the pump motor 7 shown in FIG. 5. When the carriage 3 moves from a print region to the non-print region, the carriage 3 contacts a lever (not shown) to move the capping unit 35 upwards to seal the recording head 9.

When the nozzle opening row of the recording head 9 is clogged with ink, or when the cartridge 34 is exchanged or the like to force the recording head 9 to discharge ink, the pump unit 36 is operated in the sealed state of the recording head 9, to suck ink out of the nozzle opening row by a negative pressure from the pump unit 36. Thus, dust and paper powder adhering to a portion near the nozzle opening row are cleaned. Moreover, bubbles of the recording head 9, together with ink, are discharged to a cap 37.

Figure 7:
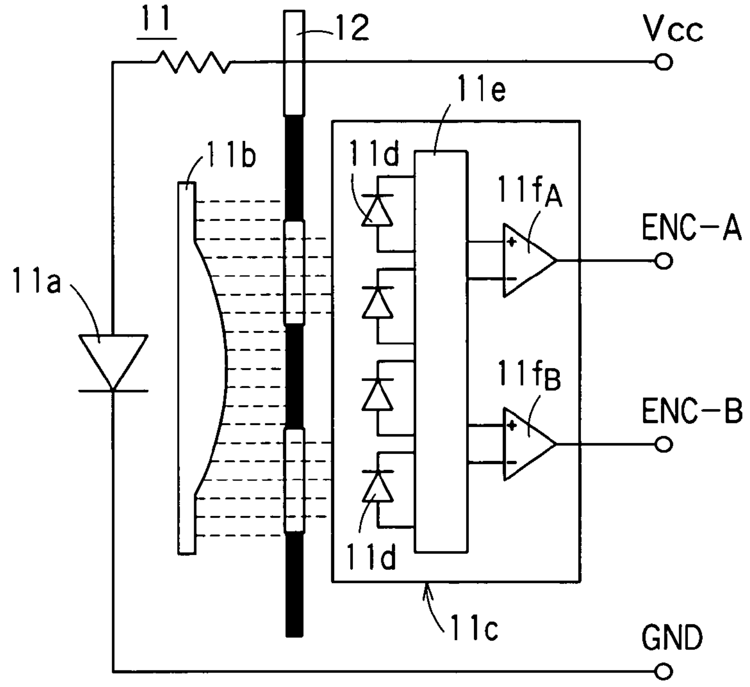
FIG. 7 is a schematic view showing the construction of a linear type encoder.

Then, the construction of the linear type encoder 11 mounted on the carriage 3 is shown in FIG. 7. This encoder 11 comprises a light emitting diode 11*a*, a collimator lens 11*b*, and a detection processing part 11*c*. The detection processing part 11*c* has a plurality of (four) photodiodes 11*d*, a signal processing circuit 11*e*, and two comparators $\mathbf{11}f_A$ and $\mathbf{11}f_B$.

If a voltage Vcc is applied between both ends of the light emitting diode 11*a* via a resistor, light rays are emitted from the light emitting diode 11*a*. The light rays are collimated by the collimator lens 11*b* to pass through the code plate 12. The code plate 12 is provided with slits at regular intervals (e.g., every 1/180 inches (=1/180×2.54 cm)).

The parallel rays passing through the code plate 12 are incident on each of the photodiodes 11*d* via a fixed slit (not shown), and converted into electric signals. The electric signals outputted from the four photodiodes 11*d* are processed by the signal processing circuit 11*e*. The signals outputted from the signal processing circuit 11*e* are compared by the comparators $\mathbf{11}f_A$ and $\mathbf{11}f_B$ and the compared results are outputted as pulses. The pulses ENC-A and ENC-B outputted from the comparators $\mathbf{11}f_A$ and $\mathbf{11}f_B$ are outputs of the encoder 11.

Figure 8:
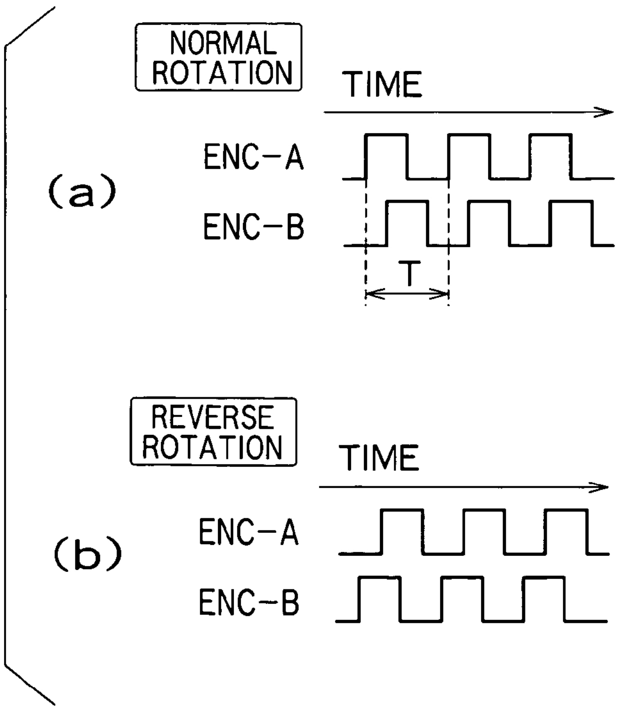
FIGS. 8(*a*) and 8(*b*) are waveform illustrations of output pulses of an encoder.

The phase of the pulse ENC-A is different from the phase of the pulse ENC-B by 90 degrees. The encoder 4 is designed so that the phase of the pulse ENC-A is advanced from the pulse ENC-B by 90 degrees as shown in FIG. 8(*a*) when the CR motor 4 is normally rotating, i.e., when the carriage 3 is moving a main scanning direction, and the phase of the pulse ENC-A lags behind the pulse ENC-B by 90 degrees as shown in FIG. 8(*b*) when the CR motor 4 is reversely rotating. One period T of the pulses corresponds to the distance between adjacent slits of the code plate 12 (e.g., 1/180 inches (=1/180×2.54 cm)). This is equal to a period of time, in which the carriage 3 moves between the adjacent slits.

On the other hand, the rotary type encoder 13 for use in the PF motor 1 has the same construction as that of the linear type encoder 11, except that the code plate is a rotating disk which rotates in accordance with the rotation of the PF motor 1. Furthermore, in the ink jet printer, the distance between adjacent slits of a plurality of slits provided in the code plate of the encoder 13 for use in the PF motor is 1/180 inches (1/180×2.54 cm). When the PF motor 1 rotates by the distance between adjacent slits, the paper is fed by 1/1440 inches (=1/1440×2.54 cm).

Figure 9:
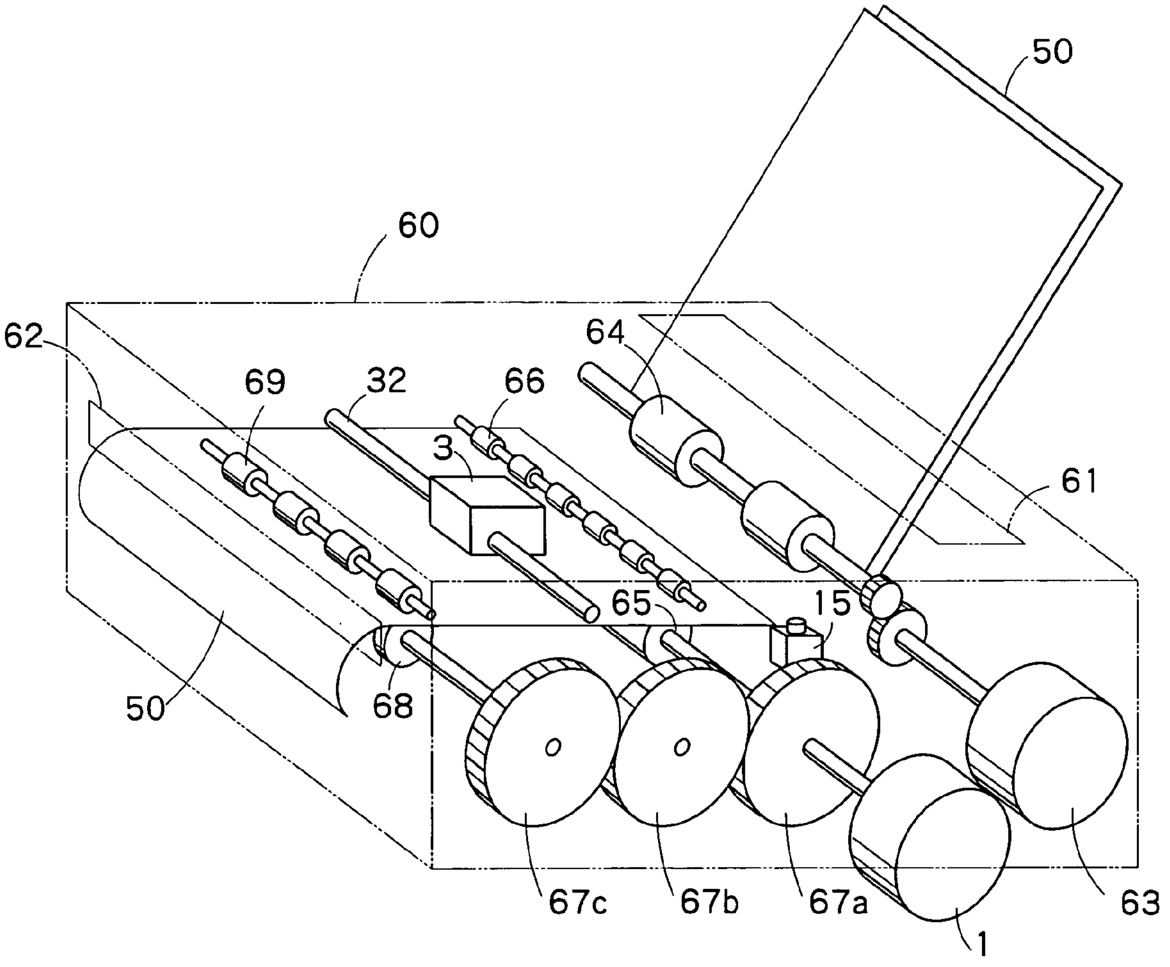
FIG. 9 is a schematic perspective view of a printer for explaining the position of a paper detecting sensor.

Referring to FIG. 9, the position of the paper detecting sensor 15 shown in FIG. 5 will be described below.

In FIG. 9, the paper 10 inserted into a paper feeding port a 61 of a printer 60 is fed into the printer 60 by means of a paper feeding roller 64 which is driven by a paper feeding motor 63. The front edge of the paper 50, which has been fed into the printer 60, is detected by, e.g., an optical paper detecting sensor 15. The paper 50, the front edge of which has been detected by the paper detecting sensor 15, is fed by means of a paper feed roller 65 and a driven roller 66 which are driven by the PF motor 1.

Subsequently, ink drops from the recording head (not shown), which is fixed to the carriage 3 moving along the carriage guide member 32, to carry out a print. Then, when the paper is fed to a predetermined position, the rear edge of the paper 50, which is currently being printed, is detected by the paper detecting sensor 15. Then, a gear 67*c* is driven, via a gear 67*b*, by means of a gear 67*a* which is driven by the PF motor 1. Thus, a paper discharging roller 68 and a driven roller 69 are rotated to discharge the printed paper 50 from a paper discharging port 62 to the outside.

First Preferred Embodiment

Figure 1:
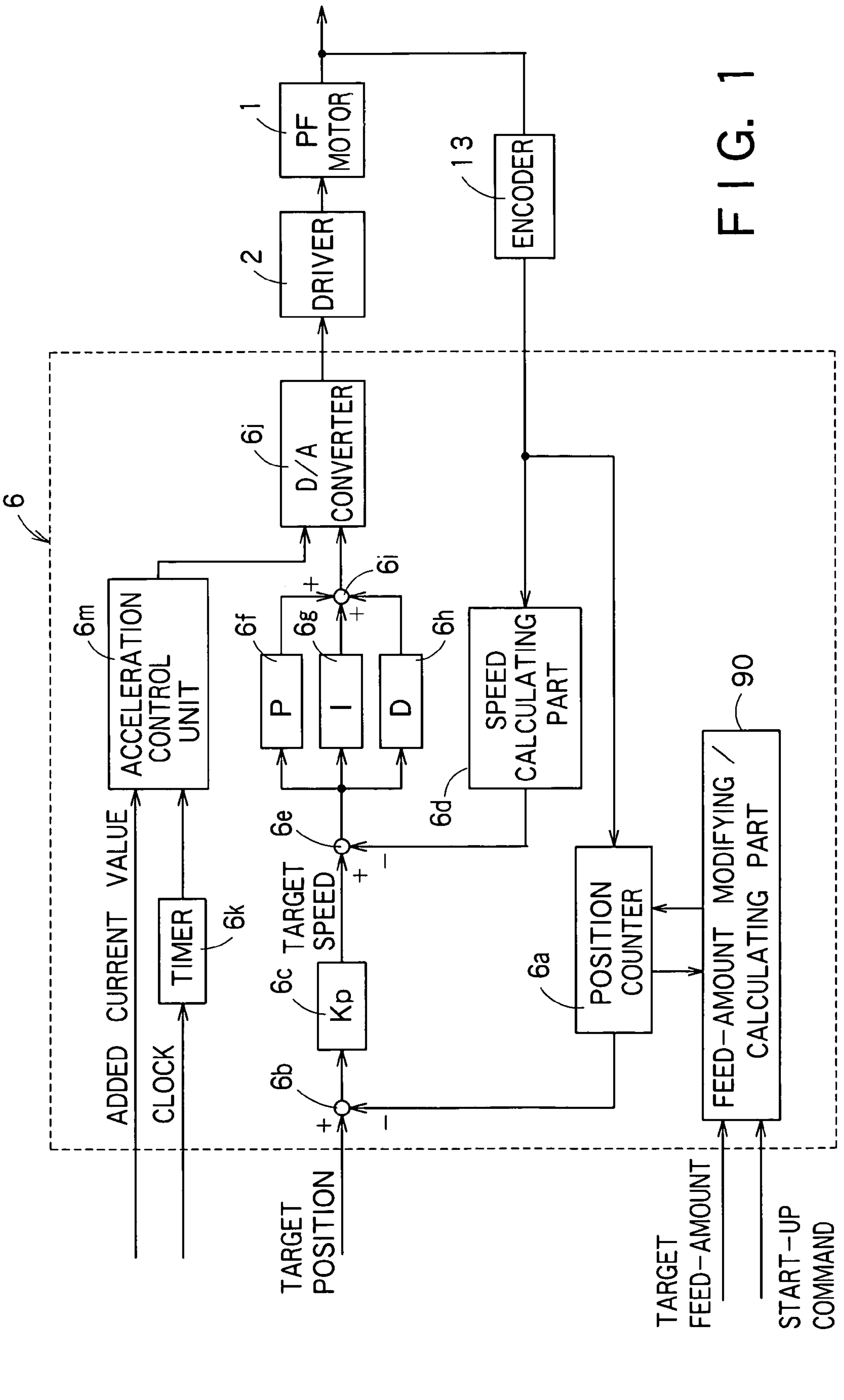
FIG. 1 is a block diagram showing the construction of the first preferred embodiment of a control unit for controlling a motor for use in a printer according to the present invention.

The construction of the first preferred embodiment of a control unit for controlling a motor for use in a printer according to the present invention will be described below. Control of a motor use in a printer is performed by a DC unit 6 shown in FIG. 5 and its construction is shown in FIG. 1.

A control unit for controlling a motor for use in a printer according to the present invention, that is, the DC unit 6 comprises a position counter 6*a*, a subtracter 6*b*, a target speed calculating part 6*c*, a speed calculating part 6*d*, a subtracter 6*e*, a proportional element 6*f*, an integrating element 6*g*, a differentiating element 6*h*, an adder 6*i*, a D/A converter 6*j*, a timer 6*k*, an acceleration control part 6*m*, and a feed-amount modifying/calculating part 90.

The position counter 6*a* is designed to detect the leading and trailing edges of each of the output pulses ENC-A and ENC-B of the encoder 13 to count the number of the detected edges, and to calculate the rotary position of the PF motor 1 on the basis of the counted value. In this counting, when the PF motor 1 is normally rotating, if one edge is detected, "+1" is added, and when the PF motor 1 is reversely rotating, if one edge is detected, "−1" is added. Each of the periods of the pulses ENC-A and ENC-B is equal to the distance between adjacent slits of a code plate of the encoder 13, and the phase of the pulse ENC-A is different from the phase of the pulse ENC-B by 90 degrees. Therefore, the counted value "1" in the above described counting corresponds to 1/4 of the distance between adjacent slits of the code plate of the encoder 13. Thus, if the counted value is multiplied by 1/4 of the distance between adjacent slits, it is possible to obtain the moving amount of the PF motor 1 from a position corresponding to a counted value "0".

The feed-amount modifying/calculating part 90 operates based on a start-up command signal for starting the PF motor 1 fed from the CPU 16, to calculate a modified paper-feed amount based on a start-up target position "0" and the counted value (the number of pulses) of the position counter 6*a* just after receiving the start-up command signal, or a previous stop position. The modified paper-feed amount is fed to the position counter 6*a* for setting a counted value so that it corresponds to the modified paper-feed amount. The nearer to the target position, the smaller the counted value being set for the position counter 6*a*.

The subtracter 6*b* is designed to calculate a position deviation of the counted value of the position counter 6*a*, from the target position "0".

The target speed calculating part 6*c* is designed to calculate a target speed of the PF motor 1 on the basis of the position deviation which is the output of the subtracter 6*b*. This operation is carried out by multiplying the position deviation by a gain $K_p$. This gain $K_p$ is determined in accordance with the position deviation. Furthermore, the value of the gain $K_p$ may be stored in a table (not shown).

The speed calculating part 6*d* is designed to calculate a speed of the PF motor 1 on the basis of the output pulses ENC-A and ENC-B of the encoder 13. This speed is obtained as follows. First, the leading and trailing edges of each of the output pulses ENC=A and ENC-B of the encoder 13 are detected, and the time interval between the edges is counted by, e.g., a timer counter. Assuming that the counted value is T, the speed of the PF motor 1 is proportional to 1/T. Furthermore, in this preferred embodiment, the speed of the PF motor is obtained by counting one period of the output pulse ENC-A, e.g., the period between the leading edge and the next leading edge, by means of a timer counter.

The subtracter 6*e* is designed to calculate a speed deviation of the actual speed of the PF motor 1, which is calculated by the speed calculating part 6*d*, from a target speed.

The proportional element 6*f* is designed to multiply the speed deviation by a constant Gp to output the multiplied result. The integrating element 6*g* is designed to integrate a value which is obtained by multiplying the speed deviation by a constant Gi. The differentiating element 6*h* is designed to multiply a difference between the current speed deviation and the last speed variation by a constant Gd to output the multiplied result. Furthermore, the operations in the proportional element 6*f*, integrating element 6*g* and differentiating element 6*h* are carried out every one period of the output pulse ENC-A of the encoder 13, i.e., in synchronism with the leading edge of the output pulse ENC-A.

The outputs of the proportional element 6*f*, integrating element 6*g* and differentiating element 6*h* are added by the adder 6*i*. Then, the added result, i.e., the driving current of the PF motor 1, is fed to the D/A converter 6*j* to be converted into an analog current. On the basis of the analog current, the PF motor 1 is driven by the paper-feed driver 2.

In addition, the timer 6*k* and the acceleration control part 6*m* are used for controlling acceleration, and the PID control using the proportional element 6*f*, integrating element 6*g* and differentiating element 6*h* is used for controlling the constant speed and deceleration during acceleration.

The timer 6*k* is designed to generate a timer interruption signal every a predetermined time on the basis of a clock signal which is fed from the CPU 16.

The acceleration control part 6*m* is designed to integrate a predetermined current value (e.g., 20 mA) into a target current value every time it receives the timer interruption signal, and to feed the integrated result, i.e., the target current value of the PF motor 1 during acceleration, to the D/A converter 6*j*. Similar to the PID control, the target current value is converted into an analog current by the D/A converter 6*j*. On the basis of this analog current, the PF motor 1 is driven by the driver 2.

The driver 2 has, e.g., four transistors. By turning each of the transistors ON and OFF on the basis of the output of the D/A converter 6*j*, the driver 2 can be selectively in (a) an operation mode in which the PF motor 1 is normally or reversely rotated, (b) a regenerative brake operation mode (a short brake operation mode, i.e., a mode in which the stopping of the PF motor 1 is maintained), or (c) a mode in which the PF motor 1 is intended to be stopped.

Figure 2:
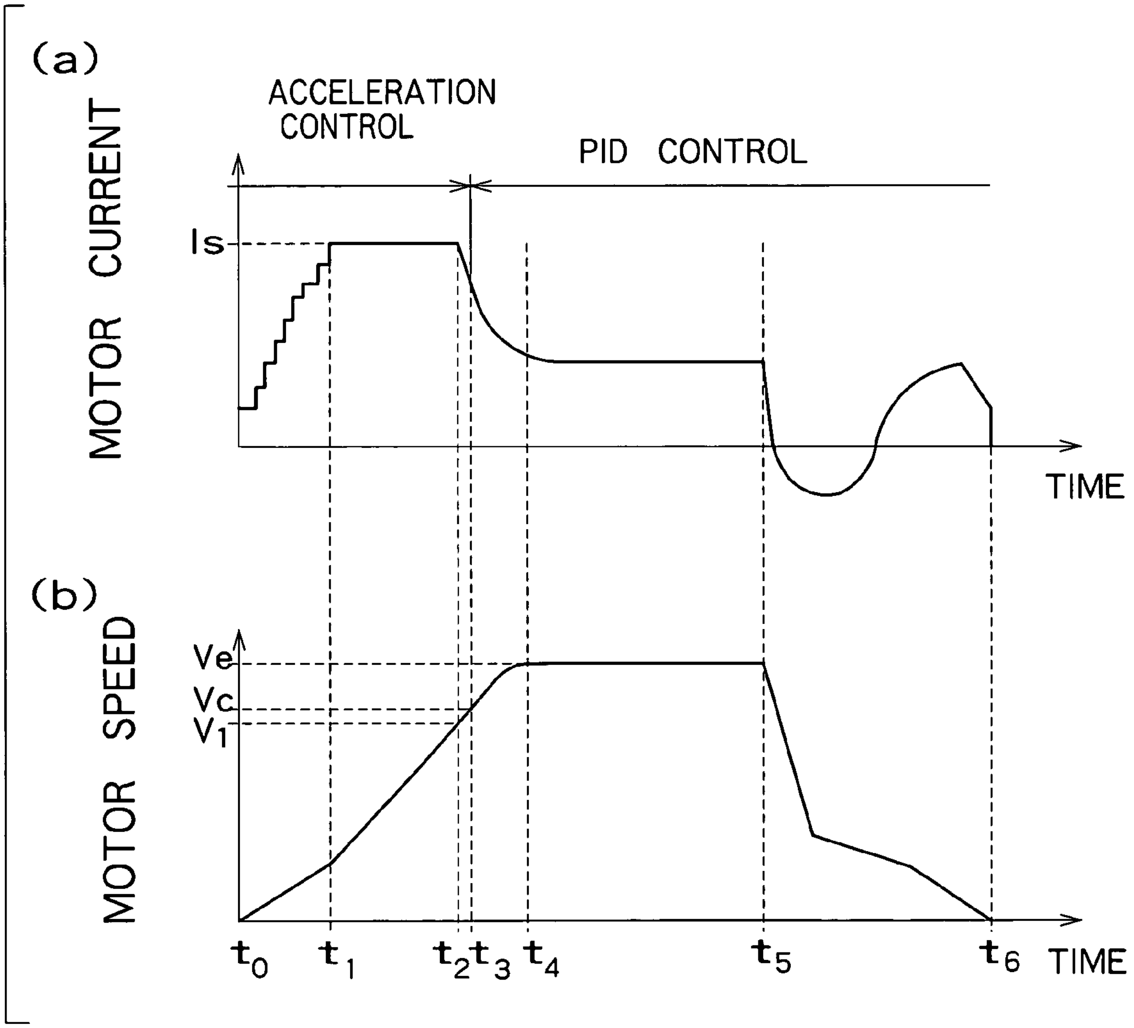
FIG. 2 shows waveforms explaining the operation of the first preferred embodiment of a control unit for controlling a motor for use in a printer.

Referring to FIGS. 2(*a*) and 2(*b*), the operation of the DC unit 6, that is, the control unit for controlling a motor for use in a printer, will be described below.

If a start-up command signal for starting the PF motor 1 is fed from the CPU 16 to the DC unit 6 when the PF motor 1 is stopped, a modified paper-feed amount is calculated by the feed-amount modifying/calculating part 90, and is set as a counted value of the position counter 6*a*, during which a start-up initial current value $I_O$ is fed from the acceleration control part 6*m* to the D/A converter 6*j*. This start-up initial current value $I_O$, together with the start-up command signal, is fed from the CPU 16 to the acceleration control part 6*m*. Then, this current value $I_O$ is converted into an analog current by the D/A converter 6*j* to be fed to the driver 2, and the PF motor 1 is started up by the driver 2 (see FIG. 2(*a*), 2(*b*)).

After the start-up command signal is received, the timer 6*k* generates a timer interruption signal every a predetermined time. Every time the acceleration control part 6*m* receives the timer interruption signal, the acceleration control part 6*m* integrates a predetermined current value (e.g., 20 mA) into the start-up initial current value $I_O$, to feed the integrated current value to the D/A converter 6*j*. Then, the integrated current value is converted into an analog current by the D/A converter 6*j* to be fed to the driver 2. Then, the PF motor 1 is driven by the driver 2 so that the value of the current supplied to the PF motor 1 is the integrated current value, so that the speed of the PF motor 1 increases (see FIG. 2(*b*)). Therefore, the current value supplied to the PF motor 1 is step-wise as shown in FIG. 2(*a*).

Furthermore, at this time, although the PID control system also operates, the D/A converter 6*j* selects and incorporates the output of the acceleration control part 6*m*.

The integration of the current value in the acceleration control part 6*m* is carried out until the integrated current value becomes a constant current value $I_S$. When the integrated current value becomes the predetermined value $I_S$ at time $t_1$, the acceleration control part 6*m* stops the integration, and supplies the constant current value $I_S$ to the D/A converter 6*j*. Thus, the PF motor 1 is driven by the driver 2 so that the value of the current supplied to the PF motor 1 becomes the current value $I_S$ (see FIG. 2(*a*)).

Then, in order to prevent the speed of the PF motor 1 from overshooting, the acceleration control part 6*m* controls the PF motor 1 so as to reduce the current, which is supplied to the PF motor 1, when the speed of the PF motor 1 becomes a predetermined speed $V_1$ (see time $t_2$). At this time, the speed of the PF motor 1 further increases. However, when the speed of the PF motor 1 reaches a predetermined speed $V_C$ (see time $t_3$ in FIG. 2(*b*)), the D/A converter 6*j* selects the output of the PID control system, i.e., the output of the adder 6*i*, to carry out the PID control.

That is, the target speed is calculated on the basis of the position deviation of the counted value of the counter 6*a* from the target position "0". In addition, the proportional element 6*f*, integrating element 6*g* and differentiating element 6*h* are operated on the basis of the speed deviation of the actual speed, which is obtained from the output of the encoder 13, from the target speed to carry out the proportional, integrating and differentiating operations. Moreover, the PF motor 1 is controlled on the basis of the sum of these calculated results. Furthermore, the above described proportional, integrating and differentiating operations are carried out in synchronism with, e.g., the leading edge of the output pulse ENC-A of the encoder 13. Thus, the speed of the PF motor 1 is controlled so as to be a desired speed $V_e$. Furthermore, the predetermined speed $V_C$ is preferably a value of 70% to 80% of the desired speed $V_e$.

The speed of the PF motor 1 reaches the desired speed $V_e$ after time $t_4$. When the PF motor 1 reaches the target position (see time $t_5$ in FIG. 2(*b*)), the PF motor 1 is decelerated to be stopped at time $t_6$.

As disclosed above, according to the present invention, a paper-feed amount at the present start-up is modified by the feed-amount modifying/calculating part 90 based on the present target feed-amount and the counted value of the position counter 6*a* just after receiving a start-up command signal, or a previous stop position, the modified paper-feed amount being set as a counted value of the position counter 6*a* for paper-feed control based on the deviation of the output of the position counter 6*a* and the target value "0".

The paper-feed control according to the present invention thus offers precise paper feeding so that a sheet of paper is stopped at a target position. The target value is not only "0", but preferably falls in the range from −3 to +3 including "0".

The maximum counted value of the position counter 6*a* corresponds to a modified paper-feed amount in this embodiment, thus requiring a small capacity for the position counter 6*a*.

Second Preferred Embodiment

The construction of the second preferred embodiment of a control unit for controlling a motor for use in a printer according to the present invention will be described below.

Figure 3:
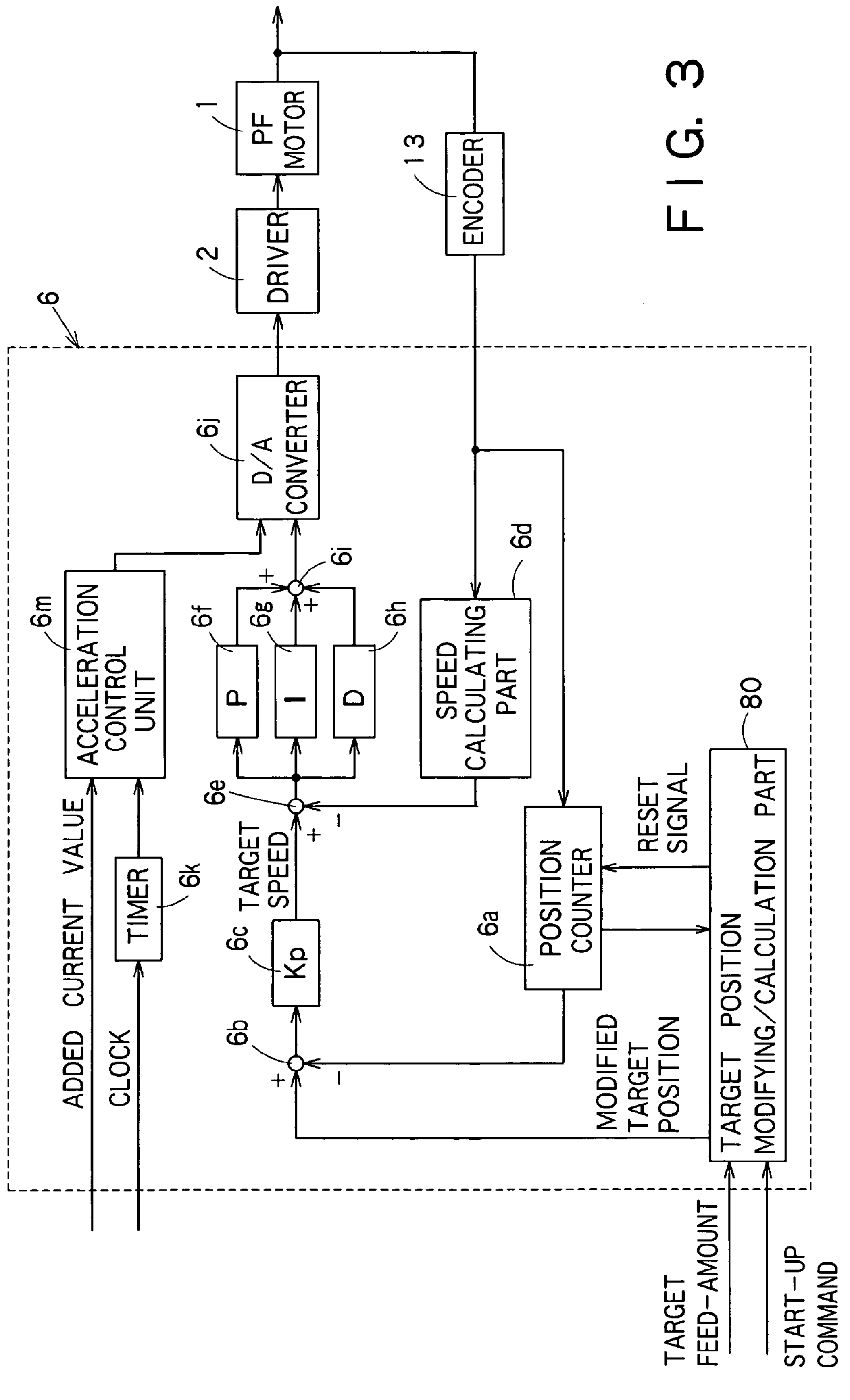
FIG. 3 is a block diagram showing the construction of the second preferred embodiment of a control unit for controlling a motor for use in a printer according to the present invention.

Control of a motor for use in a printer according to this embodiment is performed by a DC unit 6 shown in FIG. 5 the construction of which is shown in FIG. 3.

The control unit for controlling a motor for use in a printer according to this embodiment, that is, the DC unit 6 corresponds to the control unit for controlling a motor for use in a printer according to the first embodiment, but having a target position modifying/calculation part 80.

The target position modifying/calculation part 80 operates based on a start-up command signal for starting the PF motor 1 fed from the CPU 16, to calculate a modified target position based on a target feed-amount (the number of pulses) at a previous PF motor start-up, a target feed-amount (the target number of pulses) at the present PF motor start-up, and the counted value (the number of pulses) of the position counter 6*a* just after receiving the start-up command signal. The calculation result is fed to the subtracter 6*b*.

Figure 4:
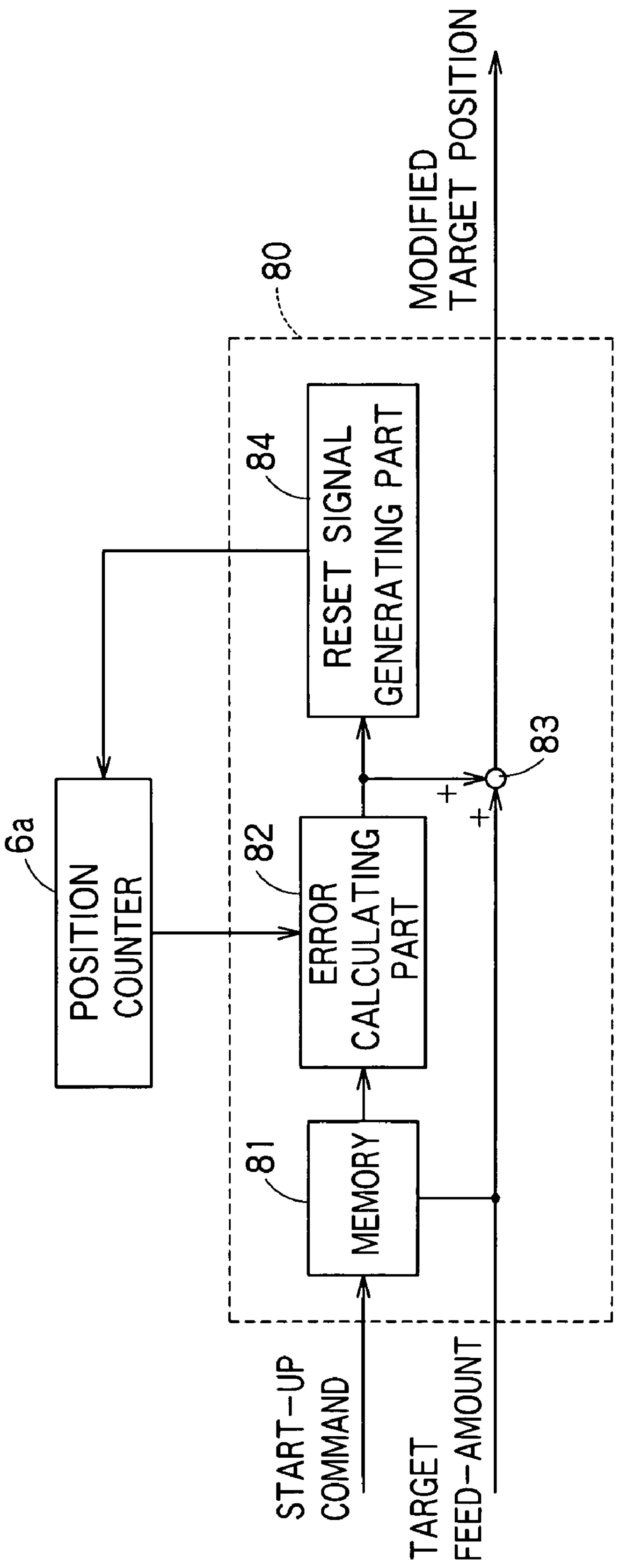
FIG. 4 is a block diagram showing an example of a target position modifying and calculating part according to the present invention.

An example of the construction of the target position modifying/calculation part 80 is shown in FIG. 4.

The target position modifying/calculation part 80 is provided with a memory 81, an error calculating part 82, an adder 83 and a reset signal generating part 84.

The memory 81 feeds the stored target feed-amount at a previous PF motor start-up to the error calculating part 82 based on the start-up command signal, and stores the target feed-amount at the present PF motor start-up fed from the CPU 16, in place of the target feed-amount that has been stored.

The error calculating part 82 calculates an error, that is, the difference between the target feed-amount at the previous PF motor start-up fed from the memory 81 and the counted value (the number of pulses) of the counter 6*a* just after receiving the start-up command signal. The error is fed to the adder 83 and also to the reset signal generating part 84 that generates a reset signal for resetting the start-up command. The error is a positive or negative value.

The adder 83 adds the error and the target position (target feed-amount) at the present PF motor start-up fed from the CPU 16, to generate the addition result as a target position.

The reset signal generating part 84 that generates a reset signal to reset the counted value of the position counter 6*a* to "0". The reset signal generating part 84 may generate a reset signal based on the output of the adder 83 instead of a command signal from the error calculating part 82.

The subtracter 6*b* calculates the positional deviation of an actual position of the PF motor 1 calculated by the position counter 6*a* from a modified target position fed by the target position modifying/calculation part 80. Paper-feed control is performed like the first embodiment so that the deviation becomes zero.

As disclosed, according to this embodiment, the target position modifying/calculation part 80 modifies the target position at the present PF motor start-up based on the target position and the counted value of the position counter 6*a* just after receiving the start-up command signal for paper-feed control based on the positional deviation of the output of the position counter 6*a* from the modified target value, thus achieving precise paper feeding.

The first and the second embodiments are disclosed as applied to an ink jet printer, however, can be applied to other printers, such as, a serial printer and a laser printer. Moreover, the first and the second embodiments are disclosed using a DC motor, however, can use an AC motor. Furthermore, the first and the second embodiments are disclosed using a sheet of paper as a printing medium, however, can use other printing media.

Third Preferred Embodiment

The third preferred embodiment according to the present invention will be described with reference to FIG. 10. The third embodiment is a method of controlling a motor for use in a printer the control procedure of which is shown in FIG. 10.

Figure 10:
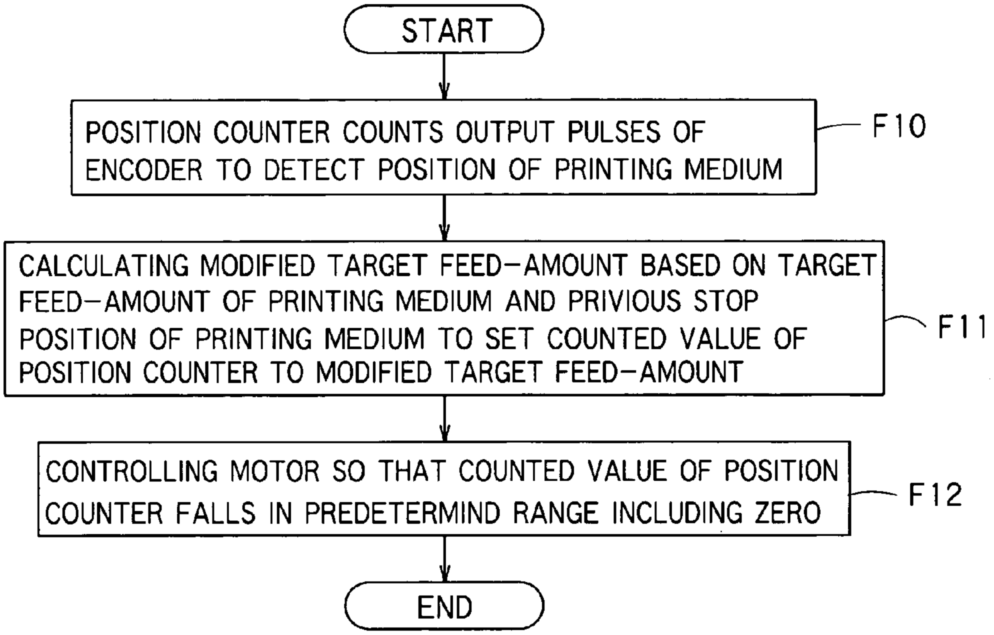
FIG. 10 is a flow chart showing a control procedure in a method for controlling a motor for use in a printer according to the present invention.

Output pulses of an encoder that rotates to follow the rotation of a PF motor are counted by a position counter to detect a position of a printing medium (a sheet of paper) transferred by the PF motor (see step F10 in FIG. 10). Calculated next is an modified target feed-amount based on a target printing medium-feed amount and a previous stop position of the printing medium detected by the position counter, the modified target feed-amount being set to a counted value of the position counter (see step F11 in FIG. 10). The PF motor is then controlled so that the counted value of the position counter falls into a predetermined range including zero (see step F12 in FIG. 10).

The control method as disclosed above is capable of stopping a printing medium at a target position, thus achieving precise paper feeding.

Fourth Preferred Embodiment

The fourth preferred embodiment according to the present invention will be described with reference to FIG. 11. The fourth embodiment is a method of controlling a motor for use in a printer the control procedure of which is shown in FIG. 11.

Figure 11:
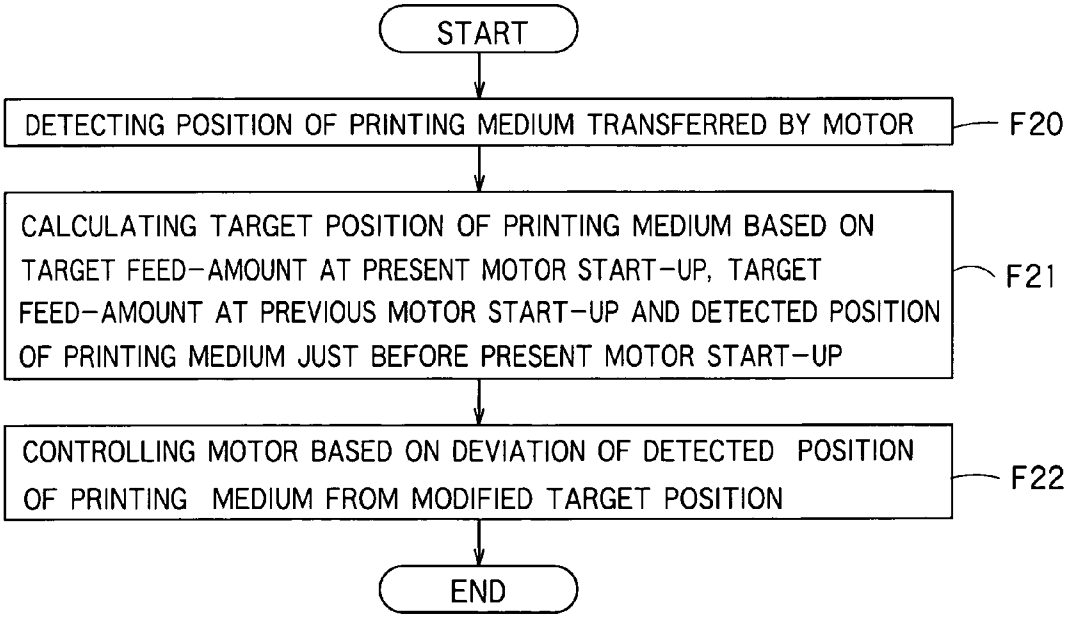
FIG. 11 is a flow chart showing another control procedure in a method for controlling a motor for use in a printer according to the present invention.

A position of a printing medium (a sheet of paper) transferred by a PF motor is detected (see step F20 in FIG. 11). Calculated next is a modified target position of the printing medium based on a target printing medium feed-amount at the present PF motor start-up, a target printing medium feed-amount at a previous PF motor start-up, and a detected position of the printing medium just before the present PF motor start-up (see step F21 in FIG. 11). The PF motor is then controlled based on the deviation of the detected position of the printing medium from the modified target position (see step F21 in FIG. 11).

The control method as disclosed above thus achieves precise paper feeding.

The step of calculating a modified target position may further includes the step of calculating an error of the printing medium feed-amount after the previous PF motor start-up based on the target printing medium-feed amount at the previous PF motor start-up and the detected position of the printing medium just before the present PF motor start-up, and the step of calculating the modified target position by adding the target printing medium feed-amount at the present motor start-up and the error.

Fifth Preferred Embodiment

Figure 12:
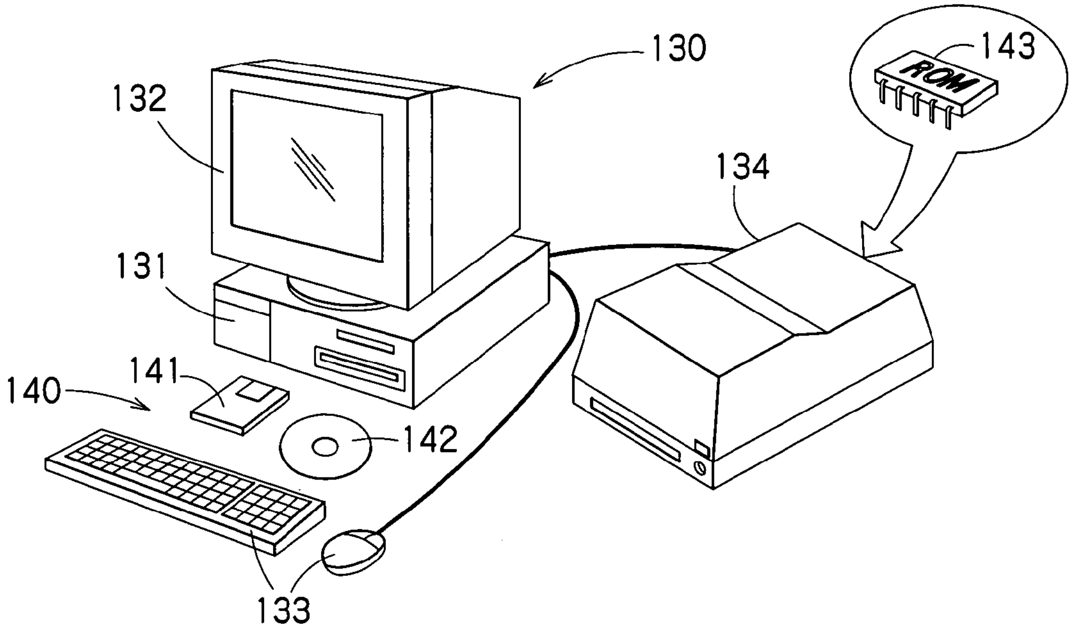
FIG. 12 is a perspective view showing an example of a computer system using a storage medium, in which a print control program has been recorded, according to the present invention.
Figure 13:
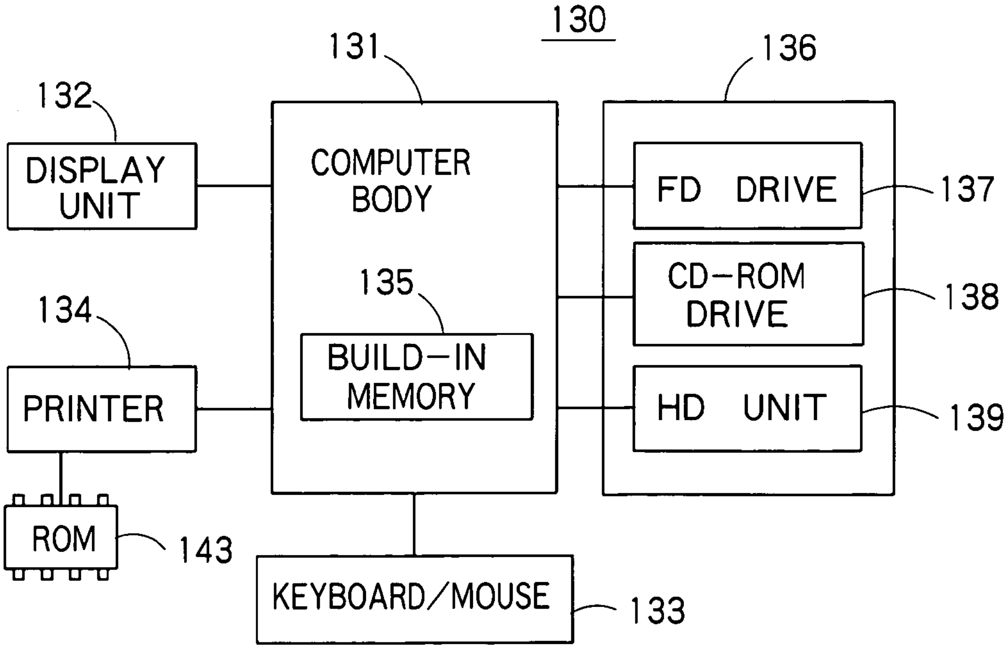
FIG. 13 is a block diagram showing an example of a computer system using a storage medium, in which a print control program has been recorded, according to the present invention.

Referring to FIGS. 12 and 13, the fifth preferred embodiment of the present invention will be described below. This preferred embodiment relates to a storage medium, in which a control program for controlling a motor for use in a printer has been stored. FIGS. 12 and 13 are a perspective view and block diagram showing an example of a computer system 130 which uses a storage medium, in which a print control program in this preferred embodiment has been recorded.

In FIG. 12, the computer system 130 comprises a computer body 130 including a CPU, a display unit 132, such as a CRT, an input unit 133, such as a keyboard or mouse, and a printer 134 for carrying out a print.

As shown in FIG. 13, the computer body 131 comprises an internal memory 135 of a RAM, and a built-in or exterior memory unit 136. As the memory unit 136, a flexible or floppy disk (FD) drive 137, a CD-ROM drive 138 and a hard disk drive (HD) unit 139 are mounted. As shown in FIG. 12, a flexible disk or floppy disk (FD) 141 which is inserted into a slot of the FD drive 137 to be used, a CD-ROM 142 which is used for the CD-ROM drive 138, or the like is used as a storage medium 140 for use in the memory unit 136.

As shown in FIGS. 12 and 13, it is considered that the FD 141 or the CD-ROM 142 is used as the storage medium for use in a typical computer system. However, since this preferred embodiment relates to a control program for controlling a motor for use in the printer 134, the control program of the present invention may be recorded in, e.g., a ROM chip 143 serving as a nonvolatile memory which is built in the printer 134. Of course, the storage medium may be any one of FDs, CD-ROMs, MOs (Magneto-Optical) disks, DVDs (Digital Versatile Disks), other optical recording disks, card memories, and magnetic tapes.

The storage medium 140 in this preferred embodiment is designed to carry out a control procedure including steps F10 through F12 shown in FIG. 10. That is, the storage medium 140 in this preferred embodiment may carry out the steps of, at least, detecting a position of a printing medium transferred by a motor by a position counter by counting output pulses of an encoder that rotates to follow the rotation of the motor, calculating a modified target feed-amount value based on a target printing medium feed-amount and a previous stop position of the printing medium detected by the position counter, and setting an counted value of the position counter to the modified target value, and controlling the motor so that the counted value of the position counter falls into a predetermined range including zero.

Sixth Preferred Embodiment

The sixth preferred embodiment of the present invention will be described below. This preferred embodiment relates to a storage medium, in which a control program for controlling a motor for use in a printer has been stored. The control program includes the steps of F20 to F22 shown in FIG. 11.

The storage medium according to this embodiment may store, at least, the program code of detecting a position of a printing medium transferred by a motor, the program code of calculating a modified target position of the printing medium based on a target feed-amount value of the printing medium at the present motor start-up, a target feed-amount value of the printing medium at a previous motor start-up, and a detected position of the printing medium just before the previous motor start-up, and the program code of controlling the motor based on the deviation of the detected position of the printing medium from the modified target position.

The program code of calculating the modified target position of the printing medium may at least includes the step of calculating an error of the feed-amount after the previous motor start-up based on the target feed-amount value at the previous motor start-up and the detected valued of the printing medium just before the present motor start-up, and the step of calculating the modified target position by adding the target feed-amount value at the present motor start-up and the error.

As disclosed, the present invention achieves precise stoppage of a printing medium even a motor for transferring the printing medium is started again after stoppage.

Seventh Preferred Embodiment

The control unit for controlling a motor for use in a printer according to the first embodiment offers precise paper feeding. However, this embodiment has a drawback in that printing at an accurate position would not be expected, when the original position "0" of the paper 50 varies, for example, caused by pulling the paper by a user, after stoppage even though no paper feed-command (start-up command) is received.

Such a problem is overcome by the seventh embodiment which will be disclosed below.

Figure 14:
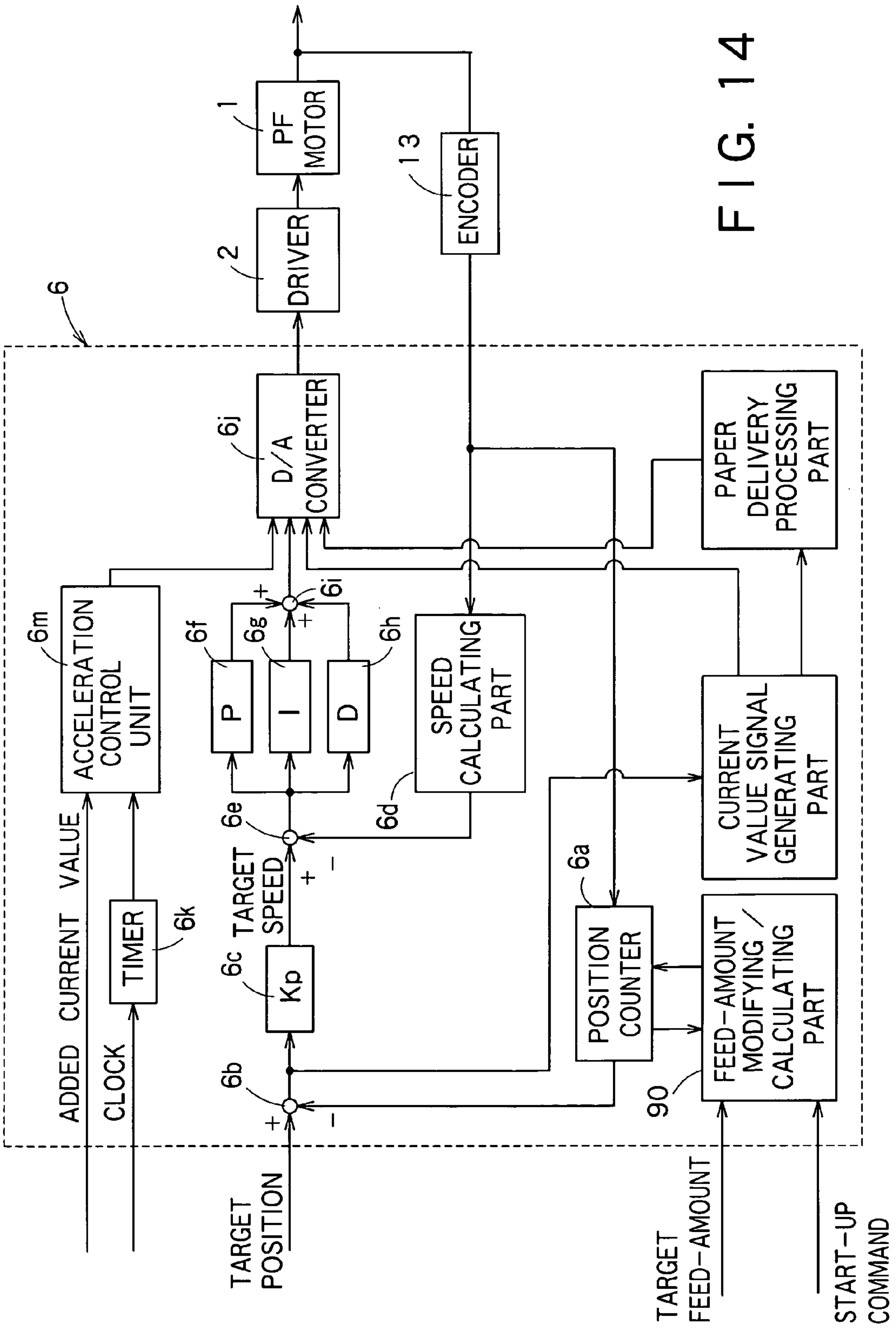
FIG. 14 is a block diagram showing the construction of the seventh preferred embodiment of a control unit for controlling a motor for use in a printer according to the present invention.
Figure 15:
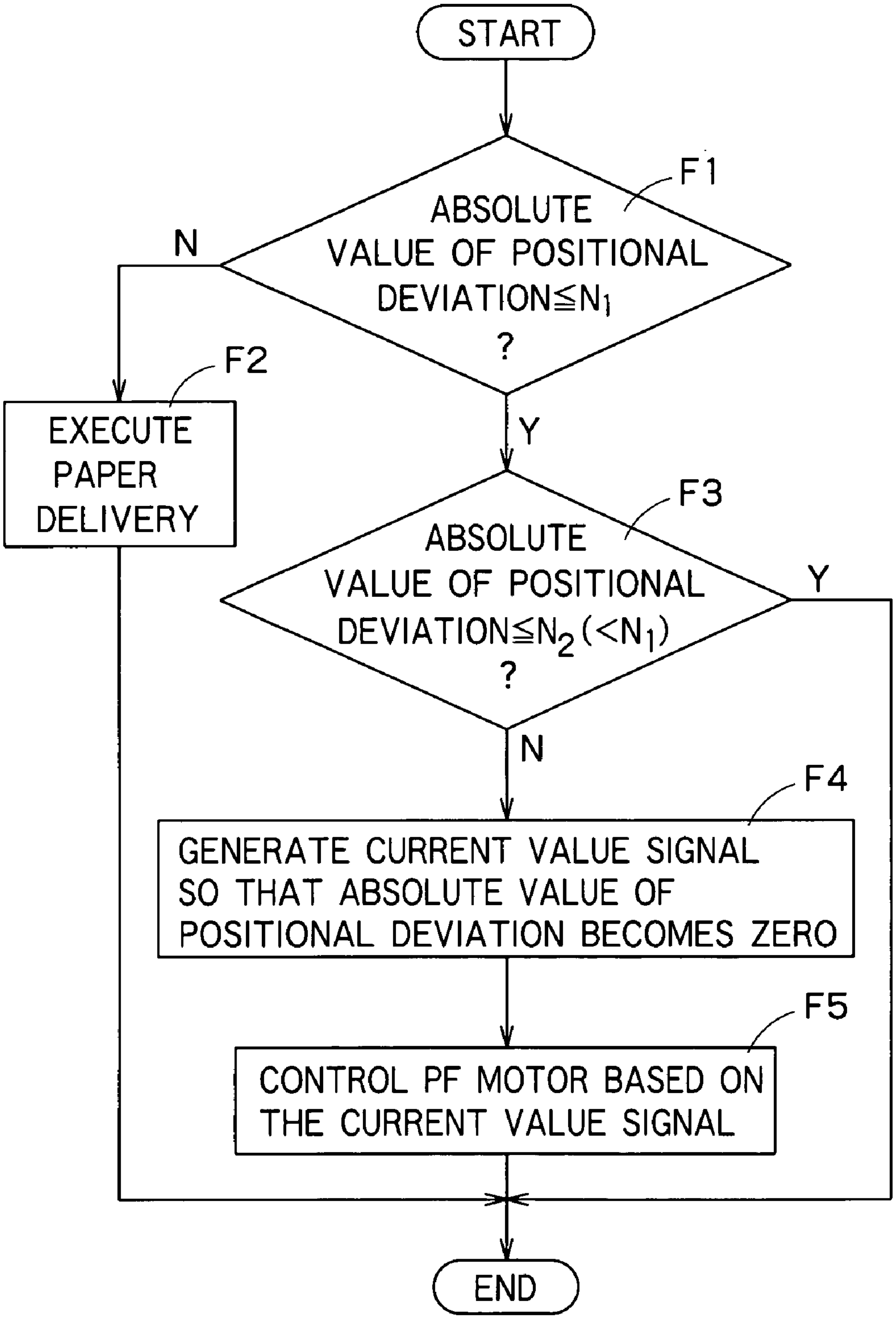
FIG. 15 is a flow chart explaining the operation of the seventh preferred embodiment.

The seventh embodiment is disclosed with reference to FIGS. 14 and 15. FIG. 14 shows a block diagram of a control unit for controlling a motor for use in a printer according to this embodiment. FIG. 15 shows a flow chart explaining the operation of the control unit according to this embodiment.

The difference between the control units 6 according to the first and the seventh embodiments are that the latter unit includes a current value signal generating part 6*p* and a paper delivery processing part 6*q*. The other parts are the same between the two embodiments, and the explanation of those is omitted here because they have been explained in the first embodiment.

The current value signal generating part 6*p* determines whether the absolute value of the positional deviation output by the subtracter 6*b* falls in the range from a predetermined value $N_1$ and another predetermined value $N_2$ ($<N_1$) while the PF motor 1 is being stopped. If the absolute value falls in the range, the current value signal generating part 6*p* generates a current value signal that resets the deviation to "0". The current value signal is fed to the D/A converter 6*j*. On the other hand, paper delivery processing is performed if the absolute value is larger than the predetermined value $N_1$. Or, the control processing ends if the absolute value is equal to or smaller than the predetermined value $N_2$.

The paper delivery processing part 6*q* feeds a current values signal required for paper delivery to the D/A converter 6*j* when it receives a paper delivery command from the current value signal generating part 6*p*.

The predetermined value $N_2$ is set, for example, to 1/1440 inches (=1/1440×2.54 cm), that is, the value corresponding to one cycle of the output pulse ENC-A of the encoder 13. In general, a motor for use in a printer stops within a range of positional deviation ±11/5760 inches (=11/5760×2.54 cm) because it is difficult to stop the motor at a position where the positional deviation is zero. The value $N_2$ in this embodiment is set to the value smaller than the positional deviation in general.

On the other hand, the predetermined value $N_1$ is set, for example, to 22/1440 inches (=22/1440×2.54 cm). This is because paper feeding in the direction that is the reverse of a paper delivery direction would cause lifting-up of a locking lever of a carriage connected to a paper-feed motor so that the carriage would collide with the locking lever when flashing or capping, and also cause jamming of sheets of paper that have been released from a paper feeder and transferred in the reverse direction with no places to be transferred, thus there is a limit for paper feeding in the reverse direction.

The predetermined values $N_1$ and $N_2$ can be varied according to the type of sheets of paper (thickness and surface friction coefficient, etc.) and the number of usage.

The operation of the current value signal generating part 6*p* is disclosed with reference to FIG. 15.

Assumption is made that the PF motor 1 stops after starting-up.

The current value signal generating part 6*p* determines whether the absolute value of the positional deviation output by the subtracter 6*b* is equal to or smaller than the predetermined value $N_1$ (see step F1 in FIG. 15). The current value signal generating part 6*p* feeds a paper delivery command to the paper delivery processing part 6*q* if the absolute is larger than the predetermined value $N_1$. The paper delivery processing part 6*q* then feeds a current value signal required for paper delivery to the D/A converter 6*j* to start the PF motor 1 for paper delivery processing based on the current value signal (see step F2 in FIG. 15).

On the other hand, if the absolute of the positional deviation is equal to or smaller than the predetermined value $N_1$, the current value signal generating part 6*p* further determines whether the absolute value is equal to or smaller than the predetermined value $N_2$ (see step F3 in FIG. 15). If so, the processing ends; while if not, or the absolute value is larger than the predetermined value $N_2$, the current value signal generating part 6*p* feeds a current value signal to the D/A converter 6*j* so that the positional deviation becomes zero (see step F4 in FIG. 15). The PF motor 1 then starts based on the current values signal and is controlled so that the positional deviation becomes zero (see step F5 in FIG. 15).

According to this control method, the original position for printing returns to the position before deviation, thus achieving printing at accurate positions.

The current value signal generating part 6*p* operates based on the output of the subtracter 6*b* in this embodiment, however, it may operates based on the output of the position counter 6*a*.

Moreover, the paper delivery processing is performed in this embodiment when the absolute value of the positional deviation is larger than the predetermined value $N_1$, however, printing can be performed with a deviated position as the original position with no paper delivery processing.

Figure 16:
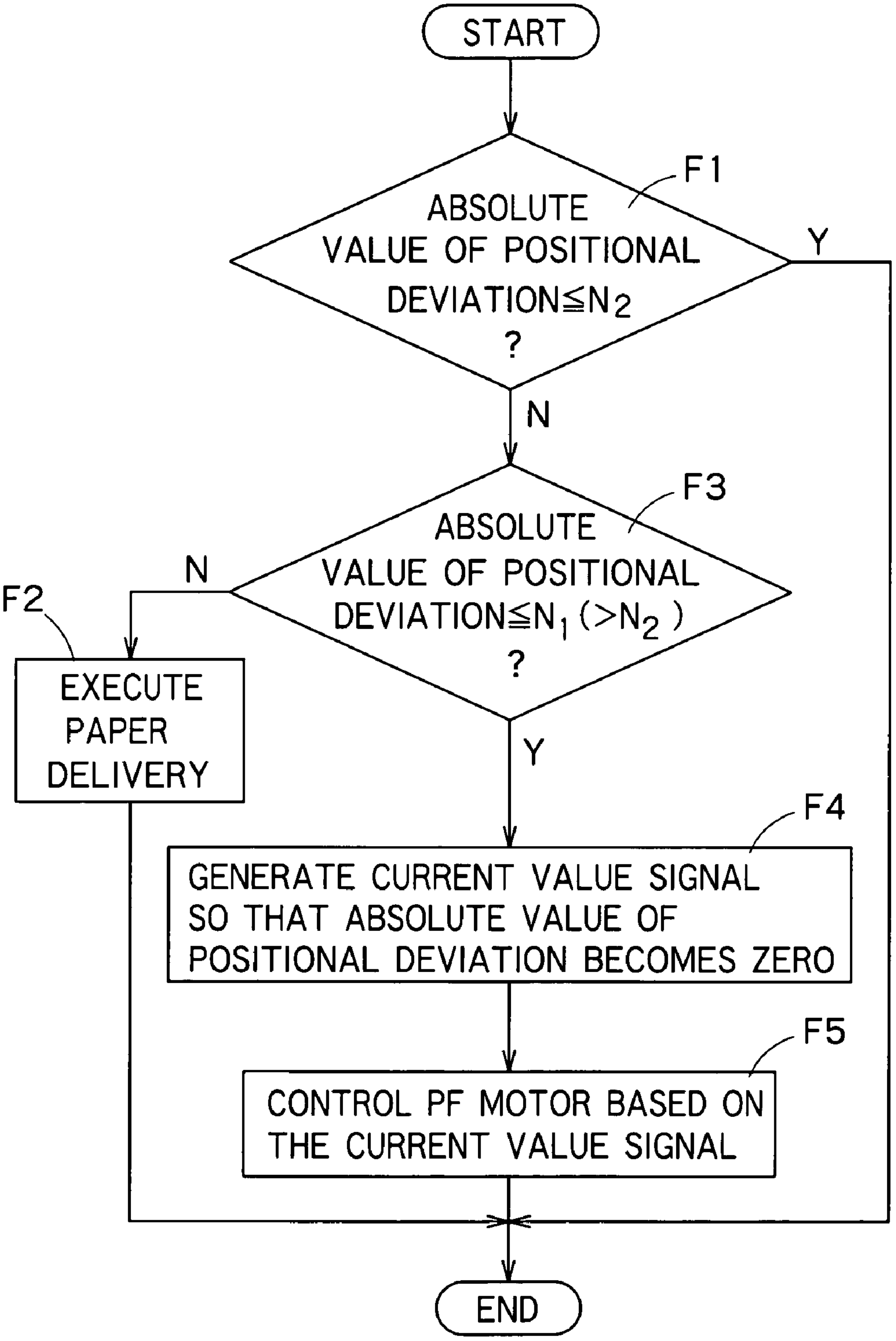
FIG. 16 is a flow chart explaining the operation of a modification of the seventh preferred embodiment.

Furthermore, the absolute value of the positional deviation is firstly compared with the predetermined value $N_1$ and then compared with the predetermined value $N_2$, however, it can be compared with the predetermined value $N_2$ firstly and then compared with the predetermined value $N_1$, as indicated by the flow chart shown in FIG. 16. The steps F1 and F3 in FIG. 15 are reversed in FIG. 16.

As disclosed above, according to this embodiment, the original position for printing can be returned to the original even if deviated after the PF motor stops, thus achieving continuous printing at accurate positions. This embodiment also has the same advantages for the first embodiment.

Moreover, this embodiment has been disclosed using a DC motor as the PF motor 1, however, can use an AC motor with the same advantages.

Eighth Preferred Embodiment

The eighth preferred embodiment of the present invention will be described below. This preferred embodiment relates to a storage medium, in which a control program for controlling a motor for use in a printer has been stored. The control program includes the steps of F1 to F5 shown in FIG. 15 or 16.

The storage medium according to this embodiment may store, at least, the program code of obtaining the deviation of an actual feed-amount of a sheet of paper calculated based on output pulses of an encoder that rotates to follow the rotation of a paper-feed motor from a target paper feed-amount value at a previous motor start-up while motor is stopping, the program code of determining whether the absolute value of the deviation falls in a range between a first predetermined value and a second predetermined value smaller than the first predetermined value, the program code of generating a current value signal so that the deviation becomes zero when the absolute value of the deviation is judged as falling in the range, and the program code of controlling the motor based on the current value signal.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A control unit for controlling a motor for use in a printer comprising:

- a position counter to count output pulses of an encoder that rotates to follow rotation of the motor, and thereby detect a position of a printing medium transferred by the motor;
- a target control amount modifying and calculating part to calculate a modified target value of a feed-amount of the printing medium based on a target value of a feed-amount of the printing medium and a previous stop position of the printing medium detected by the position counter, and set a counted value of the position counter to the modified target value; and a position control part to control the motor so that the counted value of the position counter falls into a predetermined range including zero.

2. A control unit for controlling a motor for use in a printer, as set forth in claim 1, wherein the printing medium is a paper and the motor is a paper-feed motor.

3. A control unit for controlling a motor for use in a printer, as set forth in claim 1, wherein the position control part performs PID control.

4. A control unit for controlling a motor for use in a printer, as set forth in claim 1, wherein the position counter counts-up or counts-down the output pulses according a normal or reverse rotation of the motor.

5. A control unit for controlling a motor for use in a printer comprising:

a position detecting part to detect a position of a printing medium transferred by the motor;

a target position modifying and calculating part to calculate a modified target position of the printing medium based on a target value of a feed-amount of the printing medium at the present motor start-up, another target value of a feed-amount of the printing medium at a previous motor start-up, and a position of the printing medium detected by the position detecting part just before the present motor start-up; and a position control part to control the motor based on positional deviation of the position detected by the position detecting part from the modified target position.

6. A control unit for controlling a motor for use in a printer, as set forth in claim 5, wherein the target position modifying and calculating part includes:

an error calculating part to calculate an error of the feed-amount of the printing medium at the previous motor start-up based on a target value of a control amount at a previous motor start-up and the position detected by the position detecting part just before the present motor start-up; and an adder to add the target value of a feed-amount of the printing medium at the present motor start-up and the error.

7. A control unit for controlling a motor for use in a printer, as set forth in claim 6, wherein the position detecting part is a position counter to count output pulses of an encoder that rotates to follow rotation of the motor, and the target position modifying and calculating part further includes a reset signal generating part to generate a reset signal for resetting a counted value of the position counter.

8. A control unit for controlling a motor for use in a printer, as set forth in claim 5, wherein the printing medium is a paper and the motor is a paper-feed motor.

9. A control unit for controlling a motor for use in a printer, as set forth in claim 5, wherein the position control part performs PID control.

10. A control method of controlling a motor for use in a printer comprising the steps of:

counting output pulses of an encoder that rotates to follow rotation of the motor and detecting a position of a printing medium transferred by the motor by a position counter;

calculating a modified target value of a feed-amount of the printing medium based on a target value of a feed-amount of the printing medium and a previous stop position of the printing medium detected by the position counter, and setting a counted value of the position counter to the modified target value; and controlling the motor so that the counted value of the position counter falls into a predetermined range including zero.

11. A control method of controlling a motor for use in a printer, as set forth in claim 10, wherein the printing medium is a paper and the motor is a paper-feed motor.

12. A control method of controlling a motor for use in a printer, as set forth in claim 10, wherein the step of controlling performs PID control.

13. A control method of controlling a motor for use in a printer, as set forth in claim 10, wherein the position counter counts-up or counts-down the output pulses according a normal or reverse rotation of the motor.

14. A method of controlling a motor for use in a printer comprising the steps of:

detecting a position of a printing medium transferred by the motor;

calculating a modified target position value of the printing medium based on a target value of a feed-amount of the printing medium at the present motor start-up, another target value of a feed-amount of the printing medium at a previous motor start-up, and a position of the printing medium detected just before the present motor start-up; and controlling the motor based on positional deviation of the position detected by the position detecting part from the modified target position.

15. A control method of controlling a motor for use in a printer, as set forth in claim 14, wherein the step of calculating the modified target position includes the steps of:

calculating an error of the feed-amount of the printing medium at the previous motor start-up based on the target value of the a feed-amount of the printing medium at the previous motor start-up and the position detected by the position detecting part just before the present motor start-up; and adding the target value of the feed-amount of the printing medium at the present motor start-up and the error.

16. A processor readable medium storing program code for causing a computer to control a motor for use in a printer comprising:

first program code means for, by a position counter, counting output pulses of an encoder that rotates to follow rotation of the motor to detect a position of a printing medium transferred by the motor;

second program code means for modifying and calculating part to calculate a modified target value of a feed-amount of the printing medium based on a target value of a feed-amount of the printing medium and a previous stop position of the printing medium detected by the position counter, and setting a counted value of the position counter to the modified target value; and third program code means for controlling the motor so that the counted value of the position counter falls into a predetermined range including zero.

17. A processor readable medium storing program code for causing a computer to control a motor for use in a printer comprising:

first program code means for detecting a position of a printing medium transferred by the motor;

second program code means for calculating a modified target position of the printing medium based on a target value of a feed-amount of the printing medium at the present motor start-up, another target value of a feed-amount of the printing medium at a previous motor start-up, and a position of the printing medium detected just before the present motor start-up; and third program code means for controlling the motor based on positional deviation of the detected position of the printing medium from the modified target position.

18. A control unit for controlling a motor for use in a printer comprising:

a position counter to detect a position of a sheet of paper transferred by a paper-feed motor based on output pulses of an encoder that rotates to follow rotation of the paper-feed motor;

a driving part to apply a current value to the paper-feed motor based on a target value of a feed-amount of the sheet of paper and an output of the position counter, to drive the paper-feed motor;

a current value signal generating part to determine whether the absolute value of deviation of the output of the position counter from the target value of the feed-amount of the sheet of paper falls in the range of a first predetermined value to a second predetermined value smaller than the first predetermined value during stoppage of the paper-feed motor, to generate a current value signal, when the absolute value of deviation falls in the range, so that the deviation becomes zero, wherein the driving part starts the paper-feed motor based on the current value signal when the paper-feed motor is stopped.

19. A control unit for controlling a motor for use in a printer, as set forth in claim 18 further comprising a paper delivery part for performing a paper delivery operation, wherein the current value signal generating part feeds a paper delivery command to the paper delivery part when the absolute value of deviation is larger than the first predetermined value, thus the paper delivery part performs the paper delivery operation.

20. A control unit for controlling a motor for use in a printer, as set forth in claim 18, wherein the driving part includes a PID control part.

21. A control method of controlling a motor for use in a printer comprising the steps of:

obtaining deviation, while a paper-feed motor is stopping, of an actual feed-amount of a sheet of paper calculated based on output pulses of an encoder that rotates to follow rotation of a paper-feed motor from a target feed-amount of the sheet of paper at a previous motor start-up;

determining whether the absolute value of the deviation falls in the range of a first predetermined value and a second predetermined value smaller than the first predetermined value;

generating a current value signal so that the deviation becomes zero when the absolute value falls in the range; and controlling the paper-feed motor based on the current value signal.

22. A control method of controlling a motor for use in a printer, as set forth in claim 20 further comprising the step of performing a paper delivery operation when the absolute value of the deviation is larger than the first predetermined value.

23. A processor readable medium storing program code for causing a computer to control a motor for use in a printer comprising the steps of:

first program code means for obtaining deviation, while a paper-feed motor is stopping, of an actual feed-amount of a sheet of paper calculated based on output pulses of an encoder that rotates to follow rotation of a paper-feed motor from a target feed-amount of the sheet of paper at a previous motor startup;

second program code means for determining whether the absolute value of the deviation falls in the range of a first predetermined value and a second predetermined value smaller than the first predetermined value;

third program code means for generating a current value signal so that the deviation becomes zero when the absolute value falls into the range; and fourth program code means for controlling the paper-feed motor based on the current value signal.

* * * * *